(12) United States Patent
Palmegiani et al.

(10) Patent No.: US 11,846,113 B1
(45) Date of Patent: Dec. 19, 2023

(54) TONGUE AND GROOVE PANEL CONNECTING SYSTEM

(71) Applicants: Jean Marco Palmegiani, Hialeah, FL (US); Jean Claudio Palmegiani, Hialeah, FL (US)

(72) Inventors: Jean Marco Palmegiani, Hialeah, FL (US); Jean Claudio Palmegiani, Hialeah, FL (US)

( * ) Notice: Subject to any disclaimer, the term of this patent is extended or adjusted under 35 U.S.C. 154(b) by 0 days.

(21) Appl. No.: 18/137,122

(22) Filed: Apr. 20, 2023

(51) Int. Cl.
*E04H 17/16* (2006.01)
*E04C 2/52* (2006.01)
*F16B 5/00* (2006.01)
*E04C 2/00* (2006.01)

(52) U.S. Cl.
CPC ......... *E04H 17/1602* (2021.01); *E04C 2/526* (2013.01); *E04H 17/16* (2013.01); *F16B 5/0012* (2013.01); *E04C 2002/001* (2013.01)

(58) Field of Classification Search
CPC .... F16B 5/0012; E04H 17/16; E04H 17/1602
See application file for complete search history.

(56) References Cited

U.S. PATENT DOCUMENTS

| 5,050,362 | A | * | 9/1991 | Tal | E04D 3/363 52/579 |
| 5,595,038 | A | * | 1/1997 | Prestenback | E04H 17/16 52/592.4 |
| 5,791,093 | A | * | 8/1998 | Diamond | E04F 13/12 52/36.5 |
| 7,571,571 | B1 | * | 8/2009 | Mershon | E04F 13/12 52/36.5 |
| 11,248,377 | B1 | * | 2/2022 | Wang | E04D 3/32 |
| 2005/0257473 | A1 | * | 11/2005 | Shaw | E04F 15/10 52/480 |
| 2007/0068110 | A1 | | 3/2007 | Liu | |
| 2009/0151283 | A1 | | 6/2009 | Gleeson et al. | |
| 2023/0010434 | A1 | * | 1/2023 | Prizzi | F16M 13/02 |

FOREIGN PATENT DOCUMENTS

| CA | 3 148 147 | * | 8/2022 | ............... E04B 2/74 |
| JP | 4585092 | * | 11/2010 | ............... F16B 5/06 |

* cited by examiner

*Primary Examiner* — Michael P Ferguson
(74) *Attorney, Agent, or Firm* — Sanchelima & Associates PA; Christian Sanchelima; Jesus Sanchelima

(57) ABSTRACT

A tongue and groove panel connecting system including a plurality of panels configured to be mounted to a fence and attached thereto by means of fasteners. Each panel includes a tongue at the front side and a groove at the rear side thereof. When mounted, a first panel's groove receives the tongue of an adjacent panel, thereby interconnecting and securing one another onto the fence.

7 Claims, 4 Drawing Sheets

TONGUE AND GROOVE PANEL CONNECTING SYSTEM

BACKGROUND OF THE INVENTION

1. Field of the Invention

The present invention relates to a plurality of panel assemblies and, more particularly, to a panel connecting system having a novelty geometry to increase efficiency and convenience during installation.

2. Description of the Related Art

Several designs for fence systems have been designed in the past. None of them, however, include a groove and tongue shape to engage various panels, wherein each panel further includes an attaching member that secures it to a structure, such as fences.

Applicant believes that a related reference corresponds to U.S. Patent Application Publication No. 2009/0151283 issued for a flooring sheet and modular flooring system. Applicant believes that another related reference corresponds to U.S. Patent Application Publication No. 2007/0068110 issued for a floor panel with coupling means and methods of making the same. None of these references, however, teach of a tongue that extends from a first panel first end wall and is received inside the groove of the second end of a second panel, wherein the tongue is parallel to the fastening wall. Thereby making it easier and faster to connect panels than what exists today.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a panel system which provides an easy assembling method, thereby allowing a user to readily attach the panels to a fence.

It is another object of the present invention to provide a panel system which comes directly as raw material and does not require pre-assembly. The present invention is made to be installed directly on site.

It is another object of the present invention to provide a panel system that, in an exemplary embodiment, is horizontal after post are installed on site, wherein the main profile may come in 24' long and crew to 4 post directly on site while fences on the market can only be installed to a maximum of 8 feet panels, making the present system a fast installation process It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
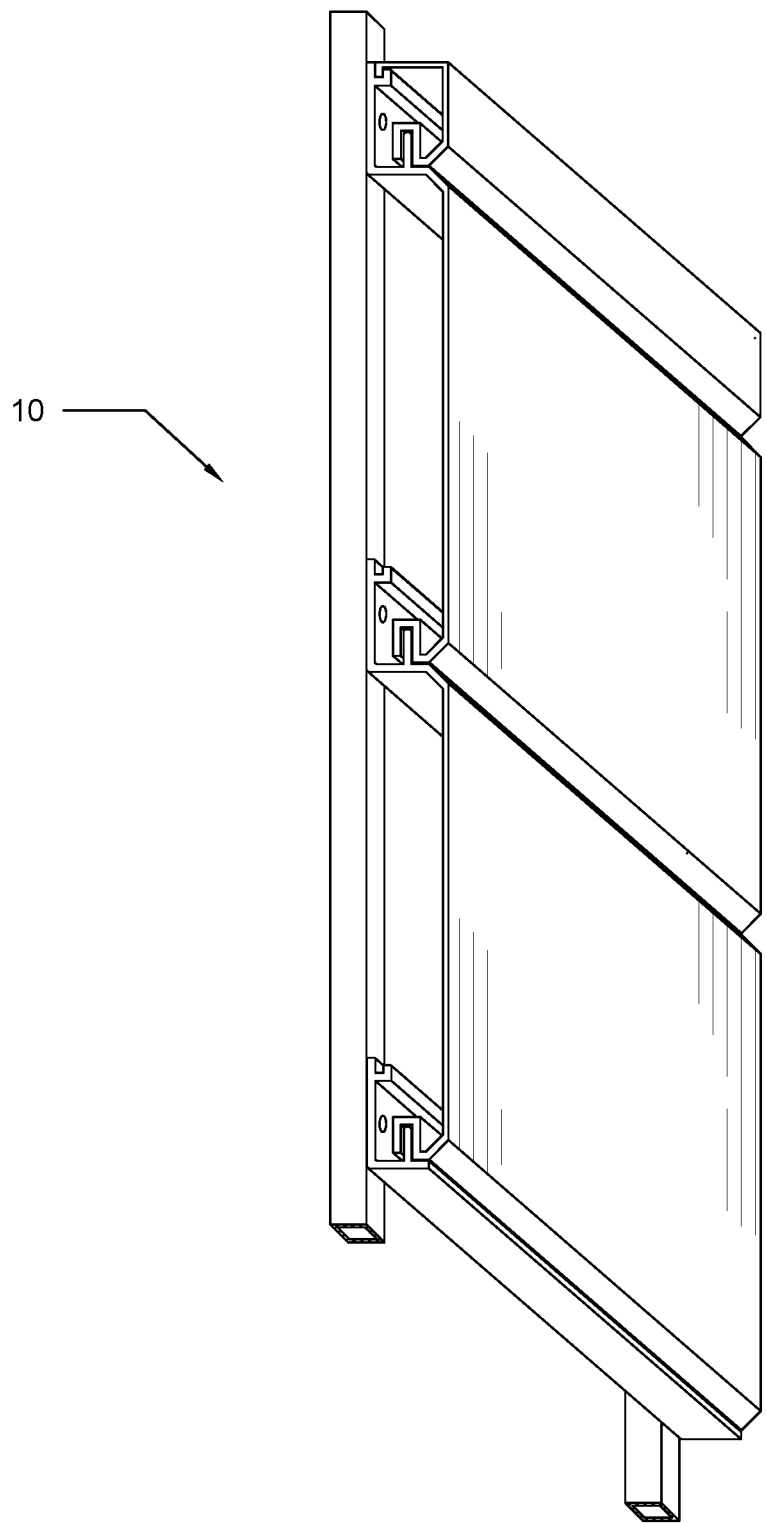
FIG. 1 represents an operational view of the present invention 10 in an exemplary embodiment.

Referring now to the drawings, where the present invention includes a plurality of panels, wherein an individual panel is generally referred to with numeral it can be observed that each panel has a top surface 20, a front connection assembly a rear connection assembly 60, an attaching member 70, wherein multiple panels are secured on a fence assembly 90. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
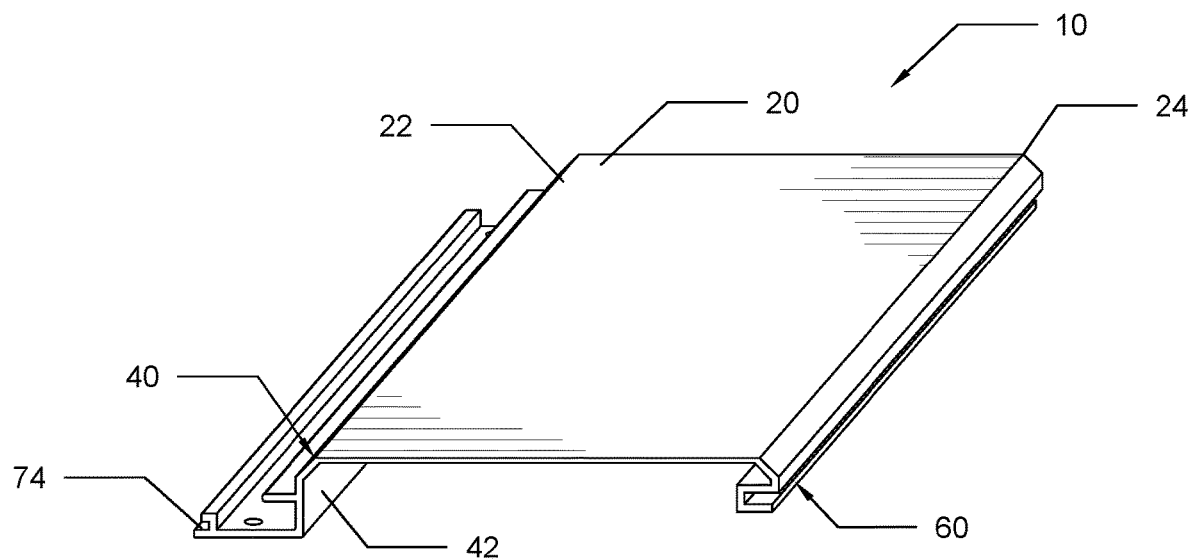
FIG. 2 shows an isometric view of the present invention.
Figure 3:
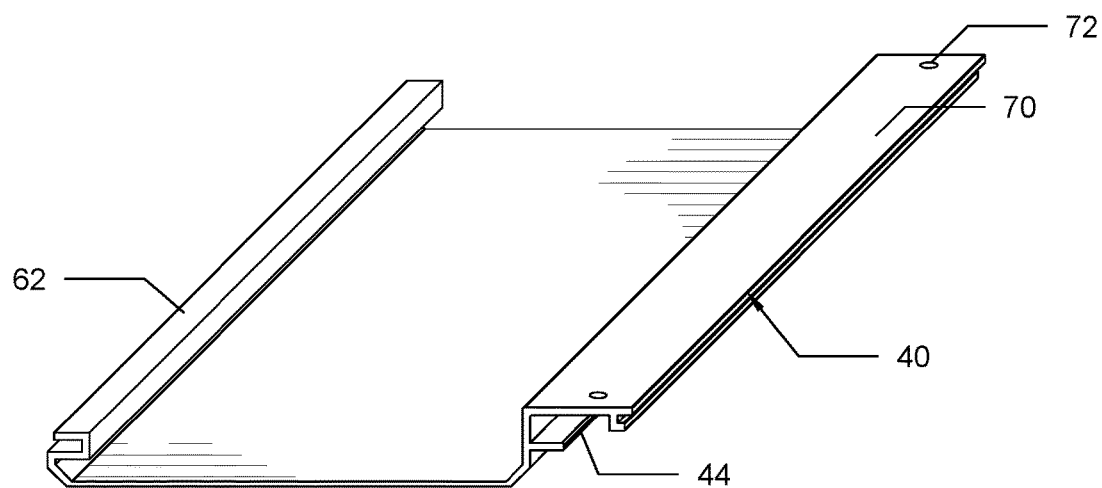
FIG. 3 illustrates a rear isometric view of the present invention

In an exemplary embodiment, each individual panel 10 may include a top surface 20, a front connection assembly 40, a rear connection assembly 60, and an attaching member 70 as can be observed in FIGS. 2 and 3. In various exemplary embodiments, each individual panel 10 may be made of a hard, resistant and sturdy material. Each panel 10, may be made of, but not in a limiting sense, polymers, ceramics, aluminum, metals, metal-based alloys, synthetic/natural fibers, steel, or any other suitable material from the art to manufacture panels. In one suitable embodiment, each individual panel 10 may have a predetermined thickness that may depend on the user's requirements. The top surface 20 of each panel 10 may have a rectangular shape, nonetheless, in other embodiments, the top surface 20 may have any other suitable regular or irregular geometry that may be suitable for fence panels. The top surface 20 may have a front edge 22 and a rear edge 24. The front connection assembly 40 and the rear connection assembly 60 may be located at said front edge 22 and said rear edge 24 accordingly as depicted in FIG. 2. The front connection assembly 40 may include a front wall 42 that may extend downward from said front edge 22. The panel 10 may exhibit a chamfered transition from said front edge 22 to said front wall 42. Along said front wall 42 and proximal to said front edge 22, the front connection assembly 40 further includes a tongue 44. The tongue 44 may extend orthogonally from the front wall 42 a predetermined distance. In various embodiments, the tongue 44 may exhibit a squared profile, a rounded profile, or any other suitable variation thereof. The rear connection assembly 60 may include a groove 62 extending downward from said rear edge 24 as depicted in FIG. 2. The groove 62 may be formed by multiple walls to create a C-shaped profile as better depicted in the cross sectional views of FIGS. 4A and 4B. In another exemplary embodiment, the groove 62 may be defined as a geometric C-shaped structure. The panel 10 may also exhibit a chamfered transition from said rear edge to said groove 62. The groove may be volumetrically suitable to receive the tongue 44 from another panel 10 when in engaged configuration. As depicted by line A in FIG. 4B, the tongue 44 and the groove 62 may be collinear, so that when multiple panels are adjacently engaged, the panels create a substantially planar surface.

In one exemplary embodiment, each individual panel 10 further includes an attaching member 70 that extends perpendicularly from a bottom edge of the front wall 42, such a geometry can be better appreciated throughout FIGS. 2-4B. One important aspect of the present invention, is that, although parallel between each other, the front wall 42 extends past the bottom periphery of the groove 62, creating a predetermined separation D (as depicted in FIG. 4A) which serves as a separation to introduce the fastener. The attaching member 70 may extend parallel to the tongue 44, however, in an exemplary embodiment, the attaching member 70 may be larger than said tongue 44 as observed in FIG. 4B. The attaching member 70, the tongue 44 and the groove 62 may span the entire width of the top surface 20. Furthermore, the attaching member 70 may include openings 72 at lateral distal ends as shown in FIG. 3, said openings may traverse the attaching member 70 crosswise. The attaching member 70 further includes a receiving portion 74 at a distal end opposite to said front wall 42 as seen in FIG. 2. Said receiving portion 74 may be defined by an upside down L-shaped element that, together with the attaching member 70, forms a slot configured to receive the male portion of a front guard 120 as defined below. The connection of the receiving portion 74 and the front guard 120 can be better observed in FIGS. 1, FIGS. 4A-4B, circled and labeled as C.

As can be seen in exemplary FIG. 1, the present invention may include a front guard 100 and the rear guard 120 configured to be mounted to the fence assembly as starting and ending points accordingly. Wherein the rear guard 100 may be the first element that is mounted to the fence 90 and receives a subsequent panel 10. Wherein the front guard 120 may be the last element attached to the last mounted panel to close the connecting system 10. The rear and front guard (100, 120) not only enhance the final loof of the present invention 10 when mounted, but also act as a support structure to start assembling the panels.

Figure 7:
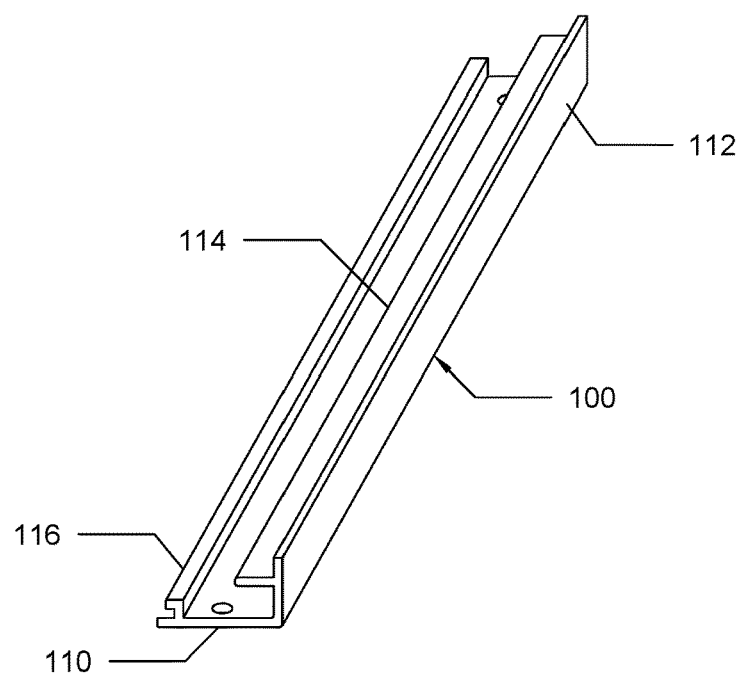
FIG. 7 is an isometric view of element 120.

As can be appreciated in FIGS. 1 and FIG. 7, the rear guard's geometry matches the geometry of the front connection assembly 40 for it to be received by the panel's groove 62. It can also be asserted that the rear guard 100 and the front connection assembly 40 have the same geometry, however, and for the sake of clarity, the parts elements that form the rear guard 100 are going to be termed as: base 110, lateral wall 112, guard's tongue 114, female portion 116, thereby avoiding confusion when referring to both the rear guard 100 and the front connection assembly 40. The base 110 may be orthogonal to said lateral wall 112. In a suitable embodiment, the base may be larger than said lateral wall 112. As can be appreciated, in one exemplary embodiment, the lateral wall 112 extends from a distal end of the base 110, whereas at the opposite distal end thereof, the female portion 116 is located. The base 110 may have openings therebetween said lateral wall 112 and said female portion 116, to receive fasteners to mount the rear guard 100 to the fence assembly. The guard's tongue 114 may extend perpendicularly from the lateral wall 112, so that said base 110 and said guard's tongue are parallel to each other, such an arrangement can be further appreciated in FIG. 7. It may be suitable for the guard's tongue 114 to have a predetermined dimension to be completely enclosed by the panel's groove 62 when assembled. As aforementioned, the female portion 116 may be located at a distal end of the base 110. In a suitable exemplary embodiment, the female portion 116 may be formed by a vertical portion that may extend upward from said base's distal end, and a horizontal portion extending perpendicularly from said vertical portion, so that the horizontal portion in conjunction with the base 110 may create a channel The female portion 116 may not only serve design purposes, but it also covers the fastener to hinder it from loosening due to external factors. Additionally, it may be able to receive part of the front guard 120 when not assembled for easy storage thereof.

Referring now to FIGS. 1 and FIG. 8, it may be appreciated that the front guard 120 may be substantially equal to the rear connection assembly 60, to the extent that the main element of both is a groove. For the sake of clarity and to distinctly describe both grooves as separate elements, the one of the front guard 120 may be hereinafter referred to as front guard's groove 122. As can be appreciated, the front guard 120 may be formed by a top surface having the front guard's groove 122 at one distal end and a cover wall at the opposite end, wherein said cover wall may further include, at a bottom distal end thereof, the male member configured to be received by said female member 116 or by said receiving portion 74. When assembling the system of panels 10, it may be evident that, as the last panel is not going to receive a subsequent one, the front connection assembly 40 of the last panel may be exposed to environmental conditions. In such a scenario the tongue 44 may be damaged or the like, and since the system is modular, a deformation of the tongue 44 may hamper it from being accurately received by another panel's groove 62. The front guard 120 may be used to cover the tongue 44 of the last panel while enhancing the final look of the system when mounted.

Figure 4A:
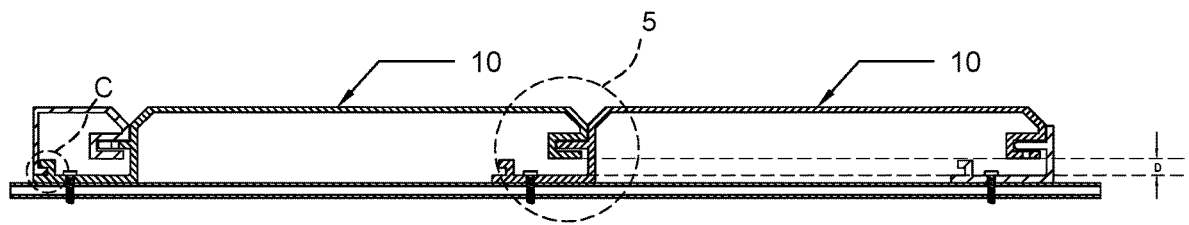
FIG. 4A is a representation of a cross sectional view of two panels in engaged configuration mounted on a structure.
Figure 4B:
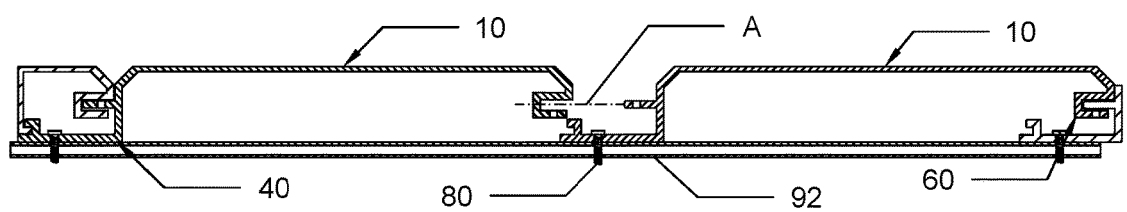
FIG. 4B is a representation of a cross sectional view of two panels in disengaged configuration.
Figure 5:
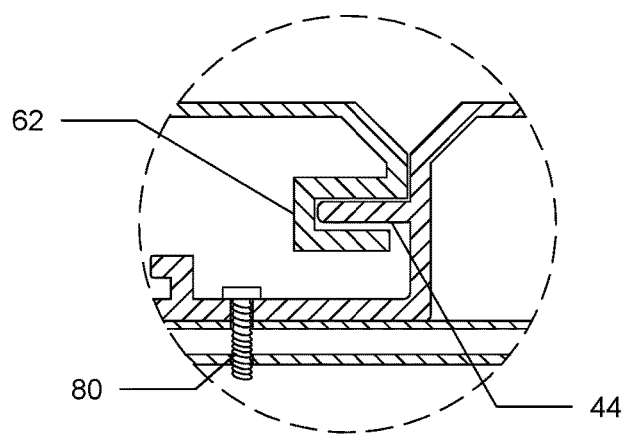
FIG. 5 is an enlarged view of the section circled in FIG. 4A.
Figure 6:
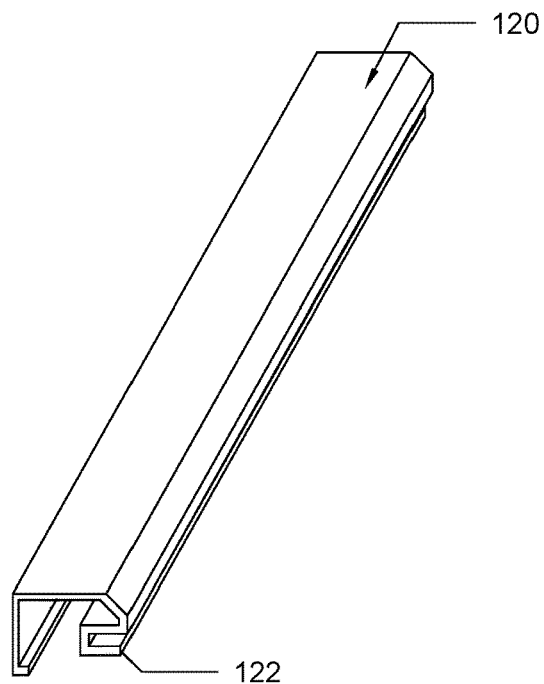
FIG. 6 is an isometric view of element 100.

The panel 10 as herein disclosed should be interpreted as a modular member capable of assembling to multiple panels by means of the tongue-and-groove interface, to be further mounted to a fence assembly 90 as depicted in exemplary FIG. 1. It should be understood that when multiple panels are mounted, the rear connection assembly 60 may face the ground and/or the base of the fence assembly 90 as depicted in exemplary FIG. 1. The panels may have an engaged configuration as depicted in FIG. 4A and a disengaged configuration FIG. 4B. The fence assembly 90 may include a frame 92 preferably composed of tubular members separated to each other by a predetermined distance. In a suitable embodiment, the width of the panel matches the separation between tubular members. In various embodiments, the frame 92 may be formed of square tube posts or any other suitable prism. The frame 92 may have a planar surface for it to be in abuting contact with the attaching member 70 when the panels 10 are mounted to the fence assembly 90. It should be understood that, in order to mount the panels, the attaching member 70 may be parallel to the frame 92 (which may also be termed as fastening wall). Fasteners 80 may be used to secure the panel 10 to the frame 92 as shown in FIGS. 4A-4B. In a suitable embodiment, fasteners 80 may be screws, but other types of mechanical fasteners from the art may be used if needed. The number of panels that can be secured to the fence 92 may be subject to the height of the frame 92. When multiple panels 10 are assembled, each groove 62 may receive the tongue 44 of the subsequent panel, making it easier to connect multiple panels than what can be found in the art.

In one exemplary embodiment, the present invention may be assembled as follows: having a fence assembly 90 with suitable features (as described above) to receive the panels.

Mounting said rear guard 100 to said frame 92 of said fence assembly 92 wherein said rear guard 100 may be the starting point to assemble the rest of the panels. Securing the rear guard 100 to said frame 92 by means of the fasteners 80, wherein said rear guard's tongue 114 may face upward. Mounting a first panel 10 to said frame, by connecting the groove 62 of the first panel with the tongue of the rear guard 10. Securing the first panel 10 using said fasteners 80. Mounting a subsequent panel 10 and connecting it to the previous panel by interlocking the tongue 44 of the previous panel 10 with the groove 62 of the next panel 10. Securing the subsequent panel to said frame 92 using said fasteners 80. Repeating the previous step to connect as many panels as needed. Connecting the front guard 120 to the last panel 10 by interconnecting the tongue 44 of the last panel 10 with the front guard's groove 122.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tongue and groove panel connecting system, comprising:
    a plurality of panels mounted within a fence assembly by means of fasteners, wherein each panel includes:
    a top surface having a front edge and a rear edge;
    a front connection assembly including a front wall that extends downward from said front edge, wherein said top surface is perpendicular to said front wall, the front connection assembly further includes a tongue that extend orthogonally from said front wall, each panel further includes an attaching member located at a bottom distal end of said front wall, said attaching member is a planar surface that is perpendicular to said front wall, said attaching member is parallel to said tongue, the attaching member includes a receiving portion at a distal end opposite to said front wall, wherein said receiving portion is defined by an upside down L-shaped element, and the attaching member further includes openings at lateral sides to receive said fasteners; and
    a rear connection assembly including a groove protruding downward from said rear edge, wherein said groove is dimensioned to receive said tongue therein;
    a rear guard having a lateral wall located at a distal end of a base, a guard tongue and female portion, the base being orthogonal to said lateral wall thereby forming an L-shaped structure, the guard tongue extends perpendicularly from the lateral wall, so that said base and said guard tongue are parallel to each other, said guard tongue being analogous to the tongue of each panel, the female portion is disposed at an opposite distal end of the base, said female portion having an inverted L shape, and said base having openings configured to receive said fasteners when mounting the rear guard within the fence assembly;
    a front guard formed by a top surface having a front guard groove at one distal end and a cover wall at the opposite end, wherein the top surface of the front guard has a smaller longitudinal section than a longitudinal section of the top surface of the panel, wherein said cover wall extends perpendicularly from said top surface of the front guard, wherein said cover wall further includes a male member located at a bottom distal end, said male member extends towards said front guard groove parallel to said top surface of the front guard, said male member being shorter in length than said cover wall, and said male member being dimensioned to be received by said receiving portion of the attaching member; and
    wherein said rear guard is a first element mounted to said fence assembly by means of inserting the fasteners through the openings of the base when the rear guard is mounted on the fence assembly, a first panel from the plurality of panels is mounted on the rear guard so that the guard's tongue is received by the groove of said first panel, wherein each of said panels, engages so that the groove of a panel receives the tongue of a subsequent an adjacent panel, thereby creating a tongue and groove connection, and the front guard mounted on a last panel of said plurality of panels wherein the tongue of the last panel is received by the front guard groove and simultaneously the male member of the cover wall is received by the receiving portion of the last panel.

2. The tongue and groove panel connecting system of claim 1 wherein said tongue and said groove are collinear.

3. The tongue and groove panel connecting system of claim 1, wherein said front wall of each panel extends past a bottom edge of said groove of a subsequent panel.

4. The tongue and groove panel connecting system of claim 1, wherein said attaching member is parallel to said frame when mounted thereupon.

5. The tongue and groove panel connecting system of claim 1, wherein said tongue, said groove and said attaching member span an entire width of the top surface of each panel.

6. A tongue and groove panel connecting system, comprising:
    a plurality of panels mounted to a frame from a fence assembly by means of fasteners, wherein each panel includes:
    a top surface having a front edge and a rear edge;
    a front connection assembly including a front wall that extends downward from said front edge, wherein each panel has a chamfered transition from said front edge to said front wall, wherein said top surface is perpendicular to said front wall, an attaching member extends from a bottom distal end of said lateral front wall, therebetween said attaching member and said front edge the front connection assembly includes a tongue that extend orthogonally from said front wall in the direction of the attaching member, said attaching member further includes a receiving portion at a distal end opposite to said front wall, wherein said receiving portion is defined by an upside down L-shaped element that, together with the attaching member, form a slot configured to receive a male portion of a front guard, and the attaching member having openings to receive the fasteners; and
    a rear connection assembly including a groove protruding downward from said rear edge, wherein each panel has a chamfered transition from said rear edge to said groove, wherein said groove is dimensioned to receive said tongue therein, said groove is C-shaped, and wherein an inner space of the groove is collinear to said tongue;
    a rear guard having a lateral wall located at a distal end of a base, a guard tongue and female portion, the base being orthogonal to said lateral wall thereby forming an L-shaped structure, the guard tongue extends perpendicularly from the lateral wall, so that said base and said guard tongue are parallel to each other, said guard tongue being analogous to the tongue of each panel, the female portion is disposed at an opposite distal end of the base, said female portion having an inverted L shape, and said base having openings configured to receive said fasteners when mounting the rear guard within the fence assembly;

the front guard formed by a top surface having a front guard groove at one distal end and a cover wall at the opposite end, wherein the top surface of the front guard has a smaller longitudinal section than a longitudinal section of the top surface of the panel. wherein said cover wall extends perpendicularly from said top surface of the front guard, wherein said cover wall further includes the male portion located at a bottom distal end, a male portion extends towards said front guard groove parallel to said top surface of the front guard, said male portion being shorter in length than said cover wall, said male portion being dimensioned to be received by said receiving portion of the attaching member; and wherein said rear guard is a first element mounted to said fence assembly by means of inserting the fasteners through the openings of the base when the rear guard is mounted on a bottom distal end of the fence assembly, a first panel from the plurality of panels is mounted on the rear guard so that guard tongue is received by the groove of said first panel, wherein each of said panels, when mounted to the frame, engages so that the groove of a panel receives the tongue of an adjacent panel, thereby creating a tongue and groove connection, and the front guard mounted on a last panel of said plurality of panels wherein the tongue of the last panel is received by the front guard groove and simultaneously the male member of the cover wall is received by the receiving portion of the last panel.

7. A tongue and groove panel connecting system, consisting of:
   a plurality of panels mounted to a frame from a fence assembly by means of fasteners, wherein each panel includes:
   a top surface having a front edge and a rear edge;
   a front connection assembly including a front wall that extends downward from said front edge, wherein each panel has a chamfered transition from said front edge to said front wall, wherein said top surface is perpendicular to said front wall, an attaching member extends from a bottom distal end of said front wall, therebetween said attaching member and said front edge the front connection assembly includes a tongue that extend orthogonally from said front wall in the direction of the attaching member, and said attaching member further includes openings to receive the fasteners; and
   a rear connection assembly including a groove protruding downward from said rear edge, wherein each panel has a chamfered transition from said rear edge to said groove, wherein said groove is dimensioned to receive said tongue therein, said groove is C-shaped, wherein an inner space of the groove is collinear to said tongue;
   a rear guard having a lateral wall located at a distal end of a base, a guard tongue and female portion, the base being orthogonal to said lateral wall thereby forming an L-shaped structure, the guard tongue extends perpendicularly from the lateral wall, so that said base and said guard tongue are parallel to each other, said guard tongue being analogous to the tongue of each panel, the female portion is disposed at an opposite distal end of the base, and said female portion having an inverted L shape;
   a front guard formed by a top surface having a front guard groove at one distal end and a cover wall at the opposite end, wherein the top surface of the front guard has a smaller longitudinal section than a longitudinal section of the top surface of the panel, wherein said cover wall extends perpendicularly from said top surface of the front guard, wherein said cover wall further includes a male member located at a bottom distal end, said male member extends towards said front guard groove parallel to said top surface of the front guard, said male member being shorter in length than said cover wall, said male member being dimensioned to be received by said receiving portion of the attaching member;
   wherein said rear guard is a first element mounted to said fence assembly by means of inserting the fasteners through openings of the base when the rear guard is mounted on a bottom distal end of the fence assembly, a first panel from the plurality of panels is mounted on the rear guard so that the guard tongue is received by the groove of said first panel, wherein each of said panels, when mounted to the frame, engages so that the groove of a panel receives the tongue of an adjacent panel, thereby creating a tongue and groove connection, each panel is further secured to the fence by inserting the fasteners through the openings of the attaching member, and the front guard mounted on a last panel of said plurality of panels wherein the tongue of the last panel is received by the front guard groove and simultaneously the male member of the cover wall is received by the receiving portion of the last panel.

* * * * *